L. E. LAW.
TESTING SCALE.
APPLICATION FILED JAN. 8, 1915.
1,141,562.
Patented June 1, 1915.
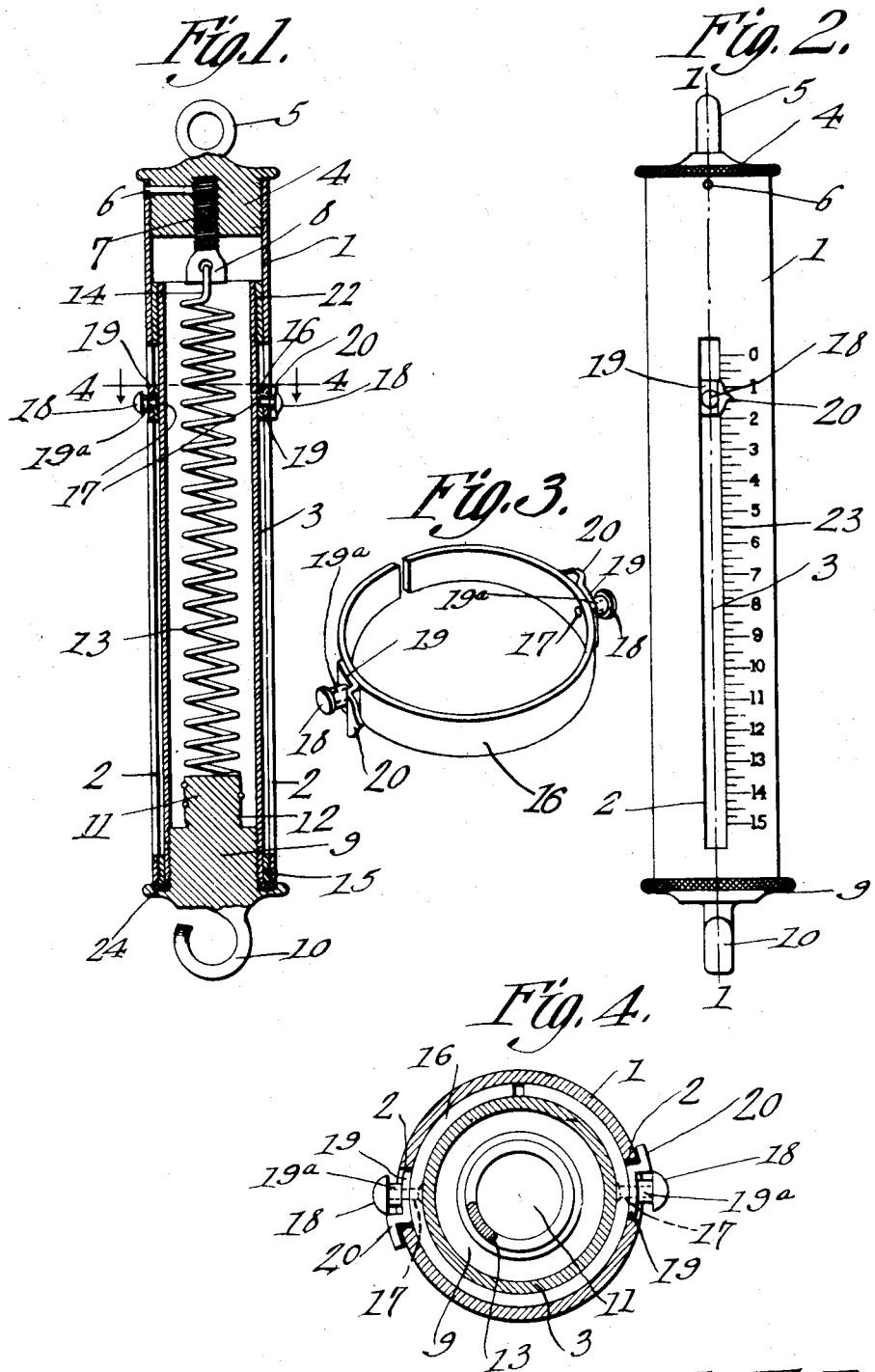
L. E. Law
Inventor
Witnesses
by C. A. Snow & Co.
Attorneys

UNITED STATES PATENT OFFICE.

LOUIS E. LAW, OF PUTNAM, CONNECTICUT.

TESTING-SCALE.

1,141,562.　　　　Specification of Letters Patent.　　Patented June 1, 1915.

Application filed January 8, 1915. Serial No. 1,184.

*To all whom it may concern:*

Be it known that I, LOUIS E. LAW, a citizen of the United States, residing at Putnam, in the county of Windham and State of Connecticut, have invented new and useful Testing-Scales, of which the following is a specification.

The present invention appertains to scales, and relates more particularly to a spring scales for determining the tensile strength of silk, linen, and other threads or strands.

It is the object of this invention, to provide in combination with a spring scales, a registering or indicating device of novel form, and so assembled with the scales, that it will be moved along a suitable graduated scale as the tension of the spring increases, and will remain at the position to which it has been moved when the thread breaks, to thereby indicate upon the scale, the breaking strength of the thread.

Another object of the invention is to provide a registering or indicating device adapted to frictionally engage the body or other portion of the scales, so as to hold its position, and arranged to coöperate with the plunger or other relatively movable part of the scales when the tension of the spring is increased, so as to be moved along the graduated scale, and whereby the indicating device will remain at the advanced position to which it has been moved, after the spring returns to its normal position, and whereby the reading may be readily and conveniently taken, to determine the amount of tension necessary to break the thread.

It is also within the scope of the invention to provide an appliance of the nature indicated, which will be comparatively simple, non-encumbering and inexpensive in construction, which may be readily applied to a scales, and which will be convenient, serviceable, efficient and thoroughly practical in use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in its preferred embodiment in the accompanying drawing, wherein:—

Figure 1 is a longitudinal section of the scales embodying the improvements, the section being taken on the line 1—1 of Fig. 2. Fig. 2 is an elevation of the scales. Fig. 3 is an enlarged perspective view of the indicating device. Fig. 4 is an enlarged cross section taken on the line 4—4 of Fig. 1.

The scales illustrated comprises a tubular body or casing 1, having diametrically opposite longitudinal slots 2. A tubular plunger 3 is slidable longitudinally within the casing 1, the plunger 3 being telescoped into the casing through one end thereof, and a plug or head 4 is threaded into the other end of the casing 1, and is provided with an outer eye or attaching element 5 to enable the casing 1 to be attached at one end to a suitable support or object. The plug 4 is preferably secured in place by means of a retaining pin or screw 6 engaged through the casing 1 and taking into the plug 4, which will prevent the plug from being rotated or unscrewed, unless the pin 6 is withdrawn. A screw 7 is threaded into the inner portion of the plug 4, and is provided with a flattened apertured head 8 projecting within the casing 1. The pin or screw 6 also engages the screw 7.

A plug or head 9 is threaded into the outer end of the tubular plunger 3, remote from the head or plug 4, and is provided with an outer hook or attaching element 10, and with an inner boss or lug 11 projecting within the plunger 3 and provided with a peripheral spiral groove 12.

A coiled wire retractile spring 13 is disposed centrally within the plunger 3 and casing 1, and has the convolutions at one end threaded upon the boss or stud 11 of the plug 9, the said convolutions of the spring engaging the groove 12, and the other end of the spring 13 is provided with a hook or loop 14 engaging the apertured head 8 of the adjusting screw 7, whereby the spring connects the opposite plugs or ends of the casing and plunger, to yieldably telescope or move the plunger 3 into the casing 1 when the parts are free.

A ring or annulus 15 is preferably secured within that end of casing 1 remote from the plug 4, to serve as a bearing for the plunger 3, whereby the plunger will slide snugly through the ring 15.

The indicating device embodies a split ring 16 disposed within the casing 1 and surrounding the plunger 3, the ring 16 having an expansive tension whereby it will frictionally bear against the inner walls of the casing 1 to hold itself in any longitudinal position to which it is moved, it being noted that the ring 16 will bear with practically even pressure against the casing throughout the circumference thereof. A pair of diametrically opposite rivets or pins 17 are secured through the ring 16 at points spaced from the split thereof, and the rivets or pins 17 project outwardly through the slots 2 of the casing 1, and have outer heads 18.

A small piece or element 19 is engaged upon each rivet 17 between spacers 19$^a$ and the outer side of the split expansion ring or slide 16 to work within the corresponding slot 2, and each of the elements 19 is provided with an outwardly offset pointer 20 passing around one edge of the corresponding slot 2 and coöperating with a suitable longitudinal graduated scale 23 provided upon the surface of the casing 1.

As illustrated, a pair of the pointers 20 is employed, and one of the graduated scales is graduated in pounds and fractions thereof for determining the tensile strength of the thread, while the other scale may be graduated in yards or other unit of lineal measure, to correspond with the first mentioned scale. However, if desired, only one of the pointers 20 need be employed, to coöperate with the graduated scale for indicating the tensile strain.

In order that the ring 16 will be moved with the plunger 3, when the plunger and casing are drawn apart, a band or collar 22 is secured upon the inner end portion of the plunger 3 and slides snugly within the casing 1 to assist in properly guiding the plunger 3 within the casing, and the collar or band 22 is arranged to bear or seat against the ring 16 to move the said ring with the plunger when the plunger is drawn outwardly.

The construction of the scales as well as the indicating device, are comparatively simple and inexpensive, the parts being readily assembled and separated.

In use, to test a silk, linen, or other thread, to determine the breaking strength thereof, one end of the scales is attached to a suitable support, while the other end has attached thereto, the thread to be tested. The thread is then brought under tensile strain, which strain is increased, acting against the tension of the spring 13, until the thread breaks. During the application of the tensile strain upon the thread, the plunger 3 will be drawn out of the casing 1 of the scales, and the band or collar 22 of the plunger will contact with and carry with it, the spring ring 16 of the indicator. When the thread breaks, the plunger 3 is immediately returned to normal or initial position under the influence of the spring 13, while the ring 16 of the indicator remains at the position to which it was advanced, since the ring 16 frictionally engages the inner side of the casing 1 by its expansion tension. The reading or readings may thus be readily taken, and the ring 16 may then be slid back to normal position at the zero graduation, by applying the thumb and finger to the opposite heads 18 of the rivets or nibs 17 so that the ring can be conveniently slid.

It will therefore be observed that the present device is useful for testing threads, and is of such construction and operation as to conveniently and efficiently serve its intended purposes.

It will also be apparent that the indicating device may be associated with various scales so as to coöperate properly therewith, necessary changes or alterations, within the scope of the appended claims, being allowed for adapting the invention to various scales.

An annular buffer 24 of suitable compressible or yieldable material is preferably inset within the rim of the plug or head 9 to contact with or bear against the adjacent end of the casing 1, when the plunger 3 is retracted by the spring, and to avoid injurious jars or shocks.

Having thus described the invention, what is claimed as new is:—

1. A testing scales comprising telescoping members, a spring connecting them, and a ring disposed within the outer telescoping member and surrounding the inner one, the ring frictionally engaging the outer telescoping member to hold its position with respect thereto, and the inner telescoping member having a portion to seat against the ring for moving the ring with it when the telescoping members are moved longitudinally relative to one another, the outer telescoping member having a graduated scale for coöperation with the said ring.

2. A testing scales comprising a tubular casing having a longitudinal slot, a plunger slidable within the casing, a spring connecting the plunger and casing, and a split expansion ring mounted within the casing to frictionally engage the same and surrounding the plunger, the casing having a graduated scale adjacent the said slot, the ring having a portion working within the said slot and provided with a pointer coöperating with the said scale, and the plunger having a collar adapted to bear against said ring and move the ring with it when the plunger is drawn outwardly.

In testimony that I claim the foregoing as my own, I have hereto affixed my signature in the presence of two witnesses.

LOUIS E. LAW.

Witnesses:
 ALVIN S. MARTIN,
 LUCIUS P. MERRIAM.